United States Patent Office 3,755,446
Patented Aug. 28, 1973

3,755,446
OPTICAL BRIGHTENERS OF THE BIS-
STYRYLBENZENE SERIES
Horst Scheuermann, Ludwigshafen, and Peter-Matthias Hell, Frankenthal, Germany, assignors to Badische Anilin- & Soda-Fabrik Aktiengesellschaft, Ludwigshafen (Rhine), Germany
No Drawing. Filed Aug. 3, 1971, Ser. No. 168,731
Int. Cl. C07c 103/24; C09b 23/00
U.S. Cl. 260—559 A
3 Claims

ABSTRACT OF THE DISCLOSURE

Bisstyrylbenzene derivatives having the formula

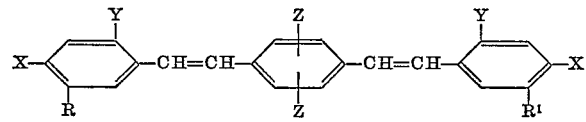

in which the most important substituents R and $R^1$ are carboxyl groups or carboxylic ester or amide groups. The compounds are useful as optical brighteners, particularly for paper.

---

This invention relates to optical brighteners having the General Formula I:

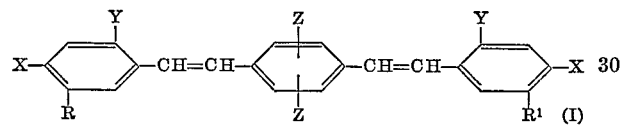

where

X denotes hydrogen, chlorine, methyl, methoxy or ethoxy;
Y denotes hydrogen, chlorine, methyl, methoxy or ethoxy, X and Y however not being both hydrogen at the same time;
Z denotes hydrogen, chlorine, methyl or methoxy;
R and $R^1$, independently of one another, denote carboxyl, carbalkoxy, carbamoyl or substituted carbamoyl or a radical having the formula $CONHNH_2$, $$CONHN(CH_3)_2$$

or $CONHNH(CH_2)_nSO_3H$ where $n$ denotes zero or one of the integers 1 to 4.

Examples of other radicals R and $R^1$ are carbomethoxy, carboethoxy, carbobutoxy, carbo-$\beta$-hydroxyethoxy, carbo-$\beta$-methoxyethoxy, carbo-$\beta$-butoxyethoxy, carbo-$\beta$-dimethylaminoethoxy, carbo-$\beta$-chloroethoxy, N-methylcarbamoyl, N,N-dimethylcarbamoyl, N-butylcarbamoyl, N-$\beta$-hydroxyethylcarbamoyl, N-$\gamma$-methoxypropylcarbamoyl or N-$\gamma$-dimethylaminopropylcarbamoyl as well as carboxylic acid morpholide, pyrrolidide, piperidide or N-methylpiperazide, or carbamoyl having the formula:

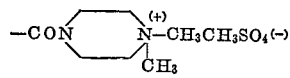

or

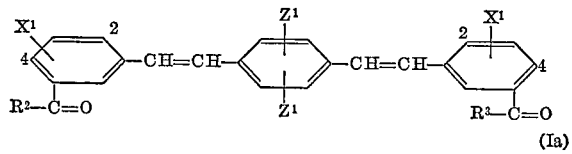

Of special industrial importance are compounds having the Formula I:

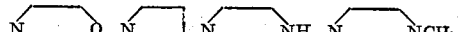

where $X^1$ denotes chlorine, methyl or methoxy, these substituents being in the 2-position or 4-position;
$Z^1$ denotes hydrogen or chlorine; and
$R^2$ and $R^3$, independently of one another, denote OH, $OCH_3$, $OC_2H_5$, $OC_4H_9$, $OCH_2CH_2OCH_3$, $$OCH_2CH_2—OCH_2CH_2—OCH_3,$$

$OCH_2CH_2—OC_4H_9$, $N(C_2H_5)_2$, $NHCH_2CH_2OH$, $OCH_2CH_2N(CH_3)_2$, $NH_2$, $NHCH_3$, $N(CH_3)_2$, $N(CH_2CH_2OH)_2$, $NHCH_2CH_2NH_2$, $NH(CH_2)_3—N(CH_3)_2$, $$NH(CH_2)_3N(CH_3)_3^{(+)}CH_3SO_4^{(-)}$$
$$NH(CH_2)_3—N—(C_4H_9)_2,$$

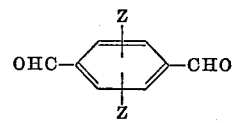

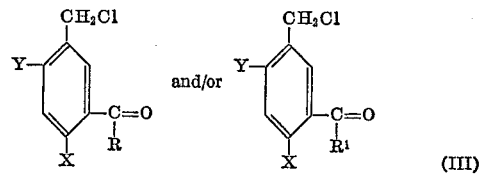

$NHNH_2$, $NHN(CH_3)_2$, $NHNHSO_3$ or $$NH(CH_2)_3—N(CH_3)_2,$$

In the production of compounds having the Formula I it is advantageous to react a compound having the Formula II:

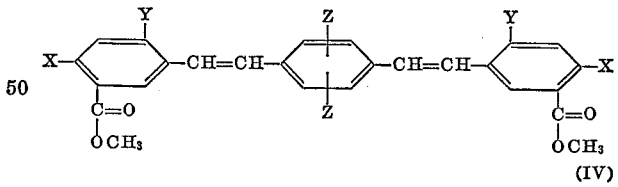

with a compound having the Formula III:

$$\text{(III)}$$

which is converted into the corresponding phosphoric ester in the manner of a Wittig reaction. When a methyl ester having the Formula III is used, the reaction products have the Formula IV:

in which the $—OCH_3$ groups may be exchanged for radicals specified for R by conventional methods.

Compounds having the Formula III are obtained from appropriate benzoic acid derivatives, preferably methyl or ethyl esters, by chloromethylation.

Compounds having the Formula I are colorless to pale yellow and are suitable as optical brighteners for cotton, rayon staple, wool, silk, synthetic polyamides and polyesters, cellulose esters and acrylonitrile polymers.

Some of the new compounds are also suitable as brighteners for paper and for polyamides, polyesters or polypropylene.

The good affinity and the outstanding whiteness which can be achieved with the new brighteners should be emphasized.

The invention is illustrated by the following examples in which parts and percentages are by weight unless otherwise stated.

EXAMPLE 1

48.5 parts of methyl 3-chloromethyl-4-methylbenzoate and 68 parts of triethyl phosphite are heated at from 140° to 150° C. for fifteen hours. The excess triethyl phosphite is then distilled off. 170 parts of dimethylformamide and 13.4 parts of terephthalaldehyde are added to the residue. 51 parts of a 30% solution of sodium methylate in methanol is dripped into the mixture at from 20° to 30° C. and the whole is then heated at 60° C. for 5 hours. After the reaction mixture has been cooled, it is poured into 800 parts of water, neutralized with hydrochloric acid, and the product is suction filtered, washed and dried. The product is recrystallized from butanol and 29.5 parts (69% of theory) of colorless crystals which melt at 166° to 168° C. are obtained. The compound has the formula:

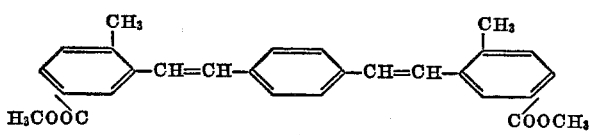

The methyl 3-chloromethyl-4-methylbenzoate required as starting material may be prepared as follows:

135 parts of α,α'-dichlorodimethyl ether is added to a mixture of 150 parts of methyl p-toluate, 10 parts of zinc chloride and 500 parts of 1,2-dichloroethane at 20° to 25° C. and the whole is boiled for fifteen hours under reflux, and then allowed to cool. The mixture is washed with water, then with 5% sodium hydrogen carbonate solution and then again with water. The organic phase is dried over sodium sulfate, evaporated and the residue distilled at 125° to 132° C. and 0.5 mm. Hg 145 parts (73% of theory) of the chloromethylation product which melts at from 46° to 48° C. is obtained.

EXAMPLE 2

As described in Example 1, 51 parts of methyl 3-chloromethyl-4-methoxybenzoate is reacted with 60 parts of triethyl phosphite and then condensed with 13.4 parts of terephthalaldehyde. The product is recrystallized from toluene. 27.6 parts (63% of theory) of pale yellow crystals are obtained having a melting point of 203° to 205° C. The compound has the formula:

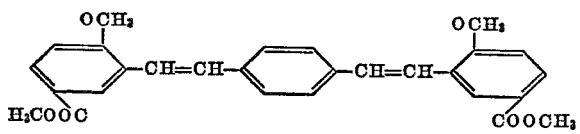

The methyl 3-chloromethyl-4-methoxybenzoate required as starting material is prepared as follows:

A mixture of 166 parts of methyl p-methoxybenzoate, 15 parts of zinc chloride and 300 parts of carbon tetrachloride is heated for eight hours at 50° C. The product is worked up as described in Example 1. 153 parts (71% of theory) of the chloromethylation product is obtained having a melting point of from 78° to 80° C.

EXAMPLE 3

As described in Example 1, 59 parts of methyl 2-methoxy-5-chloromethylbenzoate is reacted with 80 parts of triethyl phosphite and the product is condensed with 13.4 parts of terephthalaldehyde. The product is recrystallized from ethylene glycol monomethyl ether. 26.5 parts (58% of theory) of pale yellow crystals are obtained having a melting point of 243° to 246° C. The compound has the formula

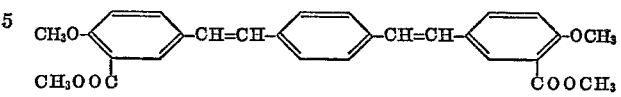

EXAMPLE 4

In the manner described in Example 1, 54 parts of methyl 2-methoxy-4-methyl-5-chloromethylbenzoate is reacted with 78 parts of triethyl phosphite and the phosphonic ester obtained is condensed with 13.4 parts of terephthalaldehyde. The product is recrystallized from butanol. 21 parts (43% of theory) of yellow crystals which melt at 208° to 211° C. are obtained. The compound has the formula:

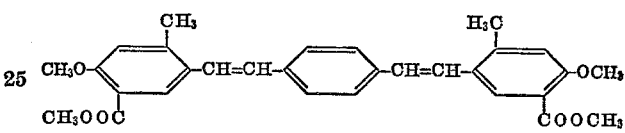

EXAMPLE 5

46.7 parts of 1,4-bis-[2'-chlorostyryl]-benzene-5'-dicarboxylic acid methyl ester is suspended in a mixture of 350 parts of 10% caustic soda solution and 75 parts of ethylene glycol monomethyl ether and heated for ten hours under reflux. The whole is then cooled and acidified with concentrated hydrochloric acid. The precipitate is suction filtered and heated in 500 parts of 10% hydrochloric acid under reflux for three hours. The whole is allowed to cool and the precipitate is suction filtered and washed with water and dried. 43.7 parts (100% of theory) of the dicarboxylic acid is obtained in the form of a pale yellow powder which does not melt below 350° C. The compound has the formula:

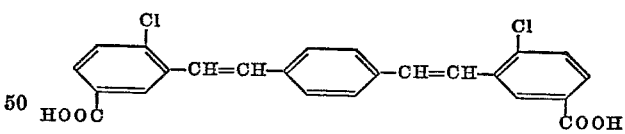

EXAMPLE 6

Ammonia is passed for six hours at 56° C. into a suspension of 47.6 parts of 1,4-bis-[2'-chlorostyryl]-benzene-5'-dicarboxylic chloride in 400 parts of acetone. After cooling, the precipitate is suction filtered, stirred into 1000 parts of water, again suction filtered and dried. 42.2 parts (97% of theory) of the diamide having the formula:

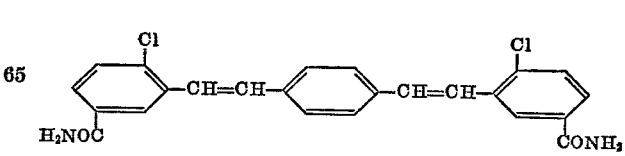

is obtained. The compound melts at 327° to 329° C.

The dicarboxylic acid chloride required as starting material is prepared as follows:

40 parts of thionyl chloride is added to a mixture of 43.9 parts of 1,4-bis-[2' - chlorostyryl]-benzene-5'-dicarboxylic acid, 2 parts of dimethylformamide and 250 parts of chlorobenzene. The mixture is heated to 85° to 90° C. in the course of one hour and left at this temperature for eight hours. The whole is allowed to cool and the deposited product is suction filtered, washed with ligroin and dried. 43 parts (90% of theory) of a yellow powder is obtained having a melting point of 232° to 235° C.

glycol dimethyl ether. The whole is then stirred for two hours at 80° C. After cooling, the reaction mixture is poured into 3000 parts of water, neutralized with acetic acid and the precipitate is suction filtered, dried and recrystallized from ethylene glycol monomethyl ether. 34.8 parts (72% of theory) of pale yellow crystals having a melting point of 267° to 270° C. is obtained. The compound has the formula:

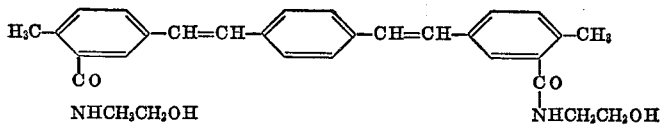

EXAMPLE 7

43.5 parts of 1,4-bis-[2' - methylstyryl]-benzene-5'-dicarboxylic acid is gradually introduced into a mixture of 42 parts of γ-dimethylaminopropylamine, 35 parts of triethylamine and 250 parts of N-methylpyrrolidone at 10° C. while stirring. The mixture is stirred for three hours and then added to 2000 parts of water; the deposited product is suction filtered, washed and recrystallized from a mixture of equal parts of ethylene glycol monomethyl ether and water. The yield is 54 parts (95% of theory) of colorless to pale yellow crystals which melt at 180° to 182° C. The compound has the formula:

EXAMPLE 10

A mixture of 45.8 parts of methyl 1,4-bis-[2-methoxystyryl]-benzene-5'-dicarboxylate, 150 parts of ethylene glycol monomethyl ether and 80 parts of hydrazine monohydrate is heated under reflux for fifteen hours. The mixture is poured into 1500 parts of water and the precipitate is suction filtered, washed with water and dried. 42.5 parts (93% of theory) of pale yellow crystals are obtained. The compound melts at 283° to 285° C. and has the formula:

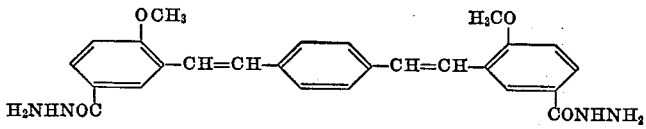

EXAMPLE 11

10.5 parts of sodium carbonate and 33 parts of 1,3-propanesultone are added to a solution of 45.8 parts of 1,4-

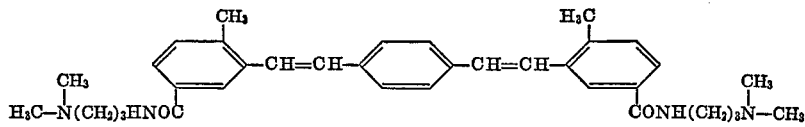

EXAMPLE 8

30 parts of dimethyl sulfate is dripped into a solution of 56.6 parts of 1,4-bis-[2-methylstyryl]-benzene-5'-dicarboxylic-γ-dimethylaminopropylamide in 130 parts of N-methylpyrrolidone. The solution is stirred for five hours and then the reaction product is precipitated with 1200 parts of acetone, suction filtered, washed with acetone and dried, 75 parts (92% of theory) of colorless to pale yellow crystals are obtained which melt at 228° to 230° C. The compound has the formula:

bis-[2' - methoxystyryl]-benzene-5'-dicarboxylic acid hydrazide in 350 parts of dimethylformamide. The whole is heated to 80° C. in the course of one hour and left at this temperature for four hours. After cooling, the mixture is filtered and 1000 parts of acetone is added to the filtrate. The precipitate is suction filtered, washed with acetone and dried. 73 parts (98% of theory) of a water-soluble pale yellow powder is obtained which does not melt below 350° C. The compound has the formula:

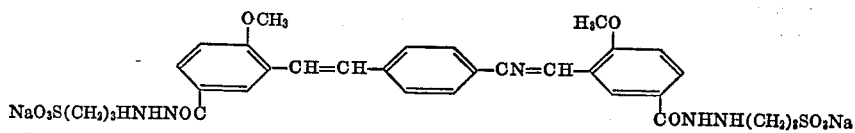

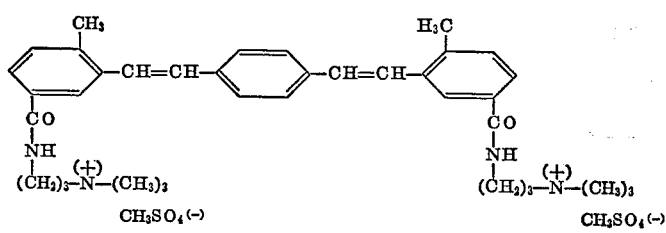

EXAMPLE 9

43.5 parts of 1,4-bis-[4' - methylstyryl]-benzene-5'-dicarboxylic acid chloride is gradually introduced at 15° to 20° C. while stirring into a mixture of 27 parts of ethanolamine, 22 parts of triethylamine and 250 parts of ethylene Further compounds (characterized by a description of their substituents) may be obtained by methods analogous to those described in the examples. They are set out in the following table by way of example.

$$\text{X}-\underset{\underset{\text{R}}{|}}{\overset{\overset{\text{Y}}{|}}{\text{C}_6\text{H}_3}}-\text{CH}=\text{CH}-\underset{\underset{\text{Z}}{|}}{\overset{\overset{\text{Z}}{|}}{\text{C}_6\text{H}_2}}-\text{CH}=\text{CH}-\underset{\underset{\text{R}^1}{|}}{\overset{\overset{\text{Y}}{|}}{\text{C}_6\text{H}_3}}-\text{X}$$

| Example | X | Y | Z | R=R¹ |
|---|---|---|---|---|
| 12 | CH₃ | H | H | COOH |
| 13 | CH₃ | H | H | CON(C₂H₅)₂ |
| 14 | CH₃ | H | H | CONH(CH₂)₃N(CH₃)₃CH₃SO₄⁻ |
| 15 | CH₃ | H | H | CON(piperazine)N—CH₃ |
| 16 | CH₃ | H | H | CONH(CH₂)₂N(CH₃)₂ |
| 17 | CH₃ | H | H | CON(morpholine)O |
| 18 | CH₃ | H | H | COOCH₃ |
| 19 | CH₃ | H | H | COOCH₂CH₂N(CH₃)₂ |
| 20 | CH₃ | H | H | COOCH₂CH₂OC₂H₅ |
| 21 | CH₃ | H | H | CONHNHSO₃H |
| 22 | CH₃ | H | Cl | CONHCH₂CH₂OH |
| 23 | CH₃ | H | Cl | COOCH₃ |
| 24 | CH₃ | H | CH₃O | COOC₂H₅ |
| 25 | CH₃O | H | H | COOH |
| 26 | CH₃O | H | H | COOCH₂CH₂OH |
| 27 | CH₃O | H | H | COOCH₂CH₂OC₄H₉ |
| 28 | CH₃O | H | H | CON(CH₃)CH₂CH₂OH |
| 29 | CH₃O | H | H | CON(piperazine)N—CH₂CH₂OH |
| 30 | CH₃O | H | CH₃ | CONH₂ |
| 31 | C₂H₅O | H | Cl | COOCH₃ |
| 32 | Cl | H | Cl | COOCH₃ |
| 33 | H | CH₃ | H | COOH |
| 34 | H | CH₃ | H | COOC₄H₉ |
| 35 | H | CH₃ | H | COOCH₂CH₂OH |
| 36 | H | CH₃ | H | COOCH₂CH₂N(C₂H₅)₂ |
| 37 | H | CH₃ | H | CON(piperazine)N—CH₃ |
| 38 | H | CH₃ | H | CON(pyrrolidine) |
| 39 | H | CH₃ | H | CONHC₄H₉ |
| 40 | H | CH₃ | H | CON(piperazine)NH |
| 41 | H | CH₃ | H | CONHCH₂CH₂OH |
| 42 | H | CH₃ | H | CON(piperidinium with CH₃, CH₂CH₂OH) CH₃SO₄⁻ |
| 43 | H | CH₃ | H | CONHNH(CH₂)₄SO₃H |
| 44 | H | CH₃ | CH₃ | COOCH₂CH₂OCH₃ |
| 45 | H | CH₃ | Cl | CONHNH(CH₂)₂SO₃H |
| 46 | H | CH₃ | CH₃O | COOCH₃ |
| 47 | H | CH₃O | H | COOH |
| 48 | H | CH₃O | H | COOCH₂CH₂OCH₃ |
| 49 | H | CH₃O | H | COOCH₂CH₂Cl |
| 50 | H | CH₃O | H | CONH(CH₂)₃N(C₄H₉)₂ |
| 51 | H | CH₃O | H | CONHCH₂CH₂OH |
| 52 | H | CH₃O | H | CONHC₄H₉ |
| 53 | H | CH₃O | H | CON(piperidine) |
| 54 | H | CH₃O | H | CONHNHSO₃H |
| 55 | H | CH₃O | H | CON(pyrrolidine) |
| 56 | H | C₂H₅O | H | COOCH₃ |
| 57 | H | CH₃O | Cl | COOCH₃ |
| 58 | H | CH₃O | Cl | COOCH₂CH₂OH |
| 59 | H | CH₃O | Cl | CONH(CH₂)₃N(CH₃)(cyclohexyl) |
| 60 | H | Cl | H | COOCH₂CH₂OH |
| 61 | H | Cl | H | COOCH₃ |
| 62 | H | Cl | H | COOC₂H₅ |
| 63 | H | Cl | H | CON(piperazine)N—CH₃ |
| 64 | H | Cl | H | CONH(CH₂)₂OCH₃ |
| 65 | H | Cl | H | CONHN(CH₃)₂ |
| 66 | H | Cl | H | CON(piperidine) |

TABLE—Continued

| | X | Y | Z | R=R¹ |
|---|---|---|---|---|
| 67 | H | Cl | Cl | COOCH₃ |
| 68 | H | Cl | Cl | CONHCH₃ |
| 69 | H | Cl | Cl | CON⟨─O⟩ |
| 70 | CH₃O | CH₃ | H | COOC₂H₅ |
| 71 | CH₃O | CH₃ | Cl | CONHNH₂ |
| 72 | CH₃ | Cl | H | COOCH₃ |
| 73 | CH₃ | CH₃ | Cl | COOCH₃ |
| 74 | CH₃ | CH₃ | Cl | CONHCH₂CH₂OH |
| 75 | Cl | Cl | H | COOCH₃ |
| 76 | CH₃O | CH₃O | H | COOCH₃ |
| 77 | H | CH₃ | H | Mixture of— R=R¹=COOCH₃; R=R¹=CONH(CH₂)₃N(CH₃)₂; R=COOCH₃; R¹=CONH(CH₂)₃N(CH₃)₂ |
| 78 | H | CH₃O | H | Mixture of— R=R¹=CONHCH₂CH₂OH; R=R¹=CONH(CH₂)₃N(CH₃)₂; R=CONHCH₂CH₂OH; R¹=CONH(CH₂)₃N(CH₃)₂ |
| 79 | H | OCH₃ | H | CON⟨─N─CH₂CH₂OH⟩ |
| 80 | H | OCH₃ | H | CON⟨─N─CH₃⟩ |
| 81 | H | OCH₃ | H | CONH(CH₂)₃N(CH₃)₂ |
| 82 | H | OCH₃ | H | CONHCH₂CH₂NH₂ |
| 83 | H | OCH₃ | H | COOCH₂CH₂N(CH₃)₂ |

Examples of use:

EXAMPLE 84

Surface application in combination with a cationic paper sizing agent: 0.04 part of the compound of Example 81 is dissolved in 1 part of 5% acetic acid and added to 100 parts of a preparation for the surface sizing of paper and containing per liter 60 g. of oxidatively degraded starch and 20 g. of a cationic polymer dispersion. The mixture obtained is then transferred in the conventional way by means of rolls within the paper machine (sizing rolls) to an unsized base paper.

In addition to the sizing of the paper against water and ink by means of the polymer dispersion and the starch, a considerable increase in the whiteness of the paper is obtained by the addition of the optical brightener.

EXAMPLE 85

Use in paper coating compositions devoid of natural binder: 0.3 part of the compound of Example 79, which has been brought into a state of very fine division by reprecipitation from a mixture of dimethylformamide and water, is added to a conventional paper coating composition of 100 parts of china clay, 110 parts of water, 0.1 part of a pigment dispersing agent (sodium polyacrylate), 16 parts of an anionic polymer dispersion which is self-thickening in an alkaline medium and which has been adjusted with casutic soda solution to a pH of from 8 to 9. After complete mixing (thirty minutes), the coating composition is applied in the usual way by means of a doctor knife to a base paper. The coated paper thus obtained after drying is considerably whiter than paper coated with the same coating composition which does not contain the brightener.

A very white paper is also obtained by using the brightener of Example 83 instead of that of Example 79.

We claim:

1. An optical brightener of the bisstyrylbenzene series having the formula

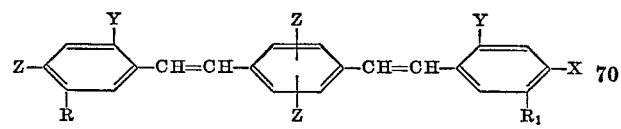

wherein:

each of X and Y is hydrogen, chlorine, methyl, methoxy or ethoxy with the proviso that X and Y do not simultaneously represent hydrogen, Z is hydrogen, chlorine, methyl or methoxy, and each of R and R¹ is selected from the group consisting of:

carboethoxy substituted in β-position by dimethylamino or diethylamino;

N-monoalkyl-substituted carbamoyl, the alkyl having 1 ot 4 carbon atoms and being substituted by amino;

N′,N′-dialkylamino-N-alkylcarbamoyl, each alkyl having 1 to 4 carbon atoms;

carboxylic acid -piperazide, -N-methylpiperazide or -N-β-hydroxy-ethylpiperazide; or carbamoyl having the formula

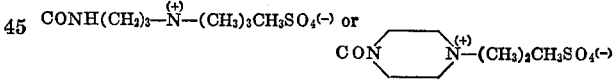

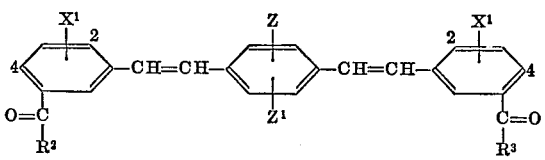

2. An optical brightener as claimed in claim 1 having the formula wherein:

X¹ denotes chlorine, methyl or methoxy located as substituents in 2-position or 4-position;

Z¹ denotes hydrogen or chlorine; and each of R² and R³ denotes a radical selected from the group consisting of the formulae:

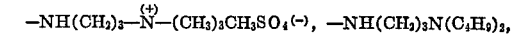
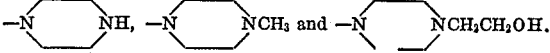
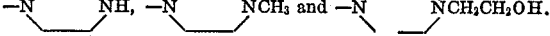

3. An optical brightener of the bisstyrylbenzene series as claimed in claim 1 having the formula
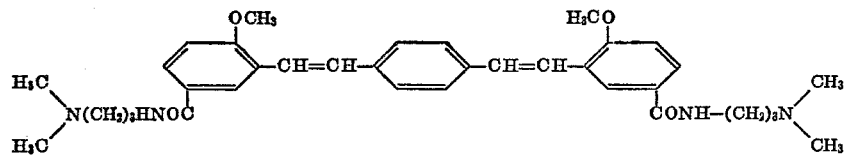
References Cited
UNITED STATES PATENTS
3,177,208  4/1965  Stilz et al. _____ 260—240 CA
JOHN D. RANDOLPH, Primary Examiner
U.S. Cl. X.R.
117—33.5 T; 252—301.2 W, 543; 260—240 CA, 471R, 473 S, 507 A, 515 A, 515 R, 520, 558 A, 558 H, 559 H

UNITED STATES PATENT OFFICE
CERTIFICATE OF CORRECTION

Patent No. 3,755,446  Dated August 28, 1973

Inventor(s) Horst Scheuermann and Peter-Matthias Hell

It is certified that error appears in the above-identified patent and that said Letters Patent are hereby corrected as shown below:

Column 2, line 24, "$NH(CH_2)_3-N(CH_3)_2$" should read -- $NHNH(CH_2)_3SO_3H$ --.

Column 6, line 13,

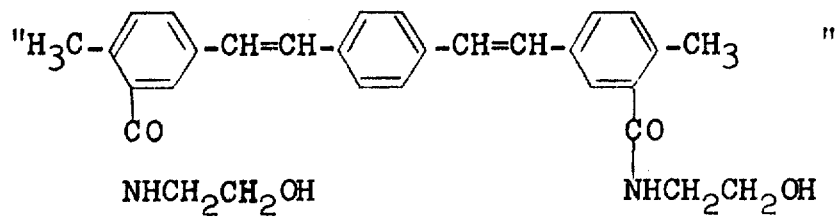

should read

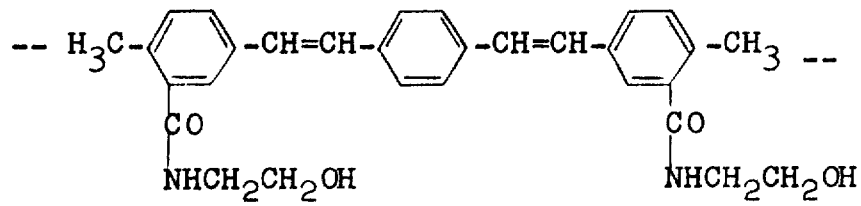

Column 7, example 52, insert -- H -- under column "Z".

Column 9, line 55, "casutic" should read -- caustic --.

Column 10, line 35, "ot" should read -- to --.

Signed and sealed this 5th day of November 1974.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,755,446
DATED : August 28, 1973
INVENTOR(S) : Horst Scheuermann and Peter-Matthias Hell It is certified that error appears in the above-identified patent and that said Letters Patent are hereby corrected as shown below:

In the heading, insert--Claims Priority, application Germany, August 12, 1970, P 20 39 993.3--.

Signed and Sealed this twenty-fourth Day of February 1976

[SEAL]

Attest:

RUTH C. MASON
*Attesting Officer*

C. MARSHALL DANN
*Commissioner of Patents and Trademarks*